(12) United States Patent
Hawker et al.

(10) Patent No.: US 9,055,361 B2
(45) Date of Patent: Jun. 9, 2015

(54) COMMUNICATION DEVICE HAVING A MICROPHONE COUPLER

(71) Applicant: BlackBerry Limited, Waterloo (CA)

(72) Inventors: Larry Hawker, Waterloo (CA); Ilan Rashish, Kitchener (CA); Robert Phillips, Waterloo (CA); Robert Lowles, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/013,851

(22) Filed: Aug. 29, 2013

(65) Prior Publication Data

US 2014/0050348 A1  Feb. 20, 2014

Related U.S. Application Data

(63) Continuation of application No. 13/324,511, filed on Dec. 13, 2011, now Pat. No. 8,548,185, which is a continuation of application No. 12/464,727, filed on May 12, 2009, now Pat. No. 8,094,856, which is a continuation of application No. 10/989,071, filed on Nov. 16, 2004, now Pat. No. 7,548,628.

(51) Int. Cl.
*H04R 9/08* (2006.01)
*H04R 1/02* (2006.01)
*H04R 1/08* (2006.01)
(Continued)

(52) U.S. Cl.
CPC ............... *H04R 1/028* (2013.01); *H04M 1/03* (2013.01); *H04R 1/083* (2013.01)

(58) Field of Classification Search
CPC .... H04R 1/345; H04R 1/2857; H04R 1/1016; H04R 1/1075; H04R 1/342; H04R 1/2842; H04R 2499/11; H04R 1/1035; H04R 1/2834; H04R 17/00; H04R 1/08; H04R 1/083; H04R 1/086; H04R 1/03; H04R 19/04; H04M 1/0214; H04M 1/23; H04M 1/3833; H04M 1/0247; H04M 1/0237; H04M 1/03; H04M 1/0202; H04M 1/0283; H04M 1/18
USPC ................. 381/338, 351, 355, 360, 365, 369; 379/419, 424, 428.01, 433, 433.01, 379/433.03, 434; 455/575.1
See application file for complete search history.

(56) References Cited

U.S. PATENT DOCUMENTS 4,450,930 A    5/1984  Killion
5,832,079 A   11/1998  Rabe
5,915,015 A    6/1999  Thornton
(Continued)

FOREIGN PATENT DOCUMENTS

DE      10201312 A1   2/2003
EP      0275996 A2    7/1988
(Continued)

*Primary Examiner* — Brian Ensey
(74) *Attorney, Agent, or Firm* — Perry + Currier, Inc.

(57) ABSTRACT

The disclosure relates to a mobile communication device. The device comprises: a housing including a housing port; a microphone in the housing; circuitry in the housing and connected to the microphone; a coupler including an acoustic conduit having a first end in communication with the housing port and a second end, and a body section associated with the microphone and in communication with the second end of the acoustic conduit; and a support to brace the coupler in the housing.

18 Claims, 5 Drawing Sheets

(51) Int. Cl.
H04R 11/04 (2006.01)
H04M 1/03 (2006.01)

(56) References Cited

U.S. PATENT DOCUMENTS 6,038,328 A * 3/2000 Hsu ................................ 381/355
6,108,416 A    8/2000 Collin et al.
6,470,176 B1   10/2002 Mendolia et al.
2002/0106091 A1 * 8/2002 Furst et al. .................... 381/335
2004/0203494 A1 * 10/2004 Eaton .......................... 455/575.1

FOREIGN PATENT DOCUMENTS

EP          1039779 A2    9/2000
WO   WO 2006/024134 A    3/2006

* cited by examiner

COMMUNICATION DEVICE HAVING A MICROPHONE COUPLER

RELATED APPLICATIONS

This application is a continuation application of U.S. patent application Ser. No. 13/324,511 (now U.S. Pat. No. 8,548,185) filed on Dec. 13, 2011, which is a continuation application of U.S. patent application Ser. No. 12/464,727 (now U.S. Pat. No. 8,094,856) filed on May 12, 2009, which is a continuation application of U.S. patent application Ser. No. 10/989,071 (now U.S. Pat. No. 7,548,628) filed on Nov. 16, 2004.

FIELD OF DISCLOSURE

The disclosure relates to a voice communication device having a microphone coupler, where the coupler provides an air channel from the exterior of the device to a microphone located within the device.

BACKGROUND

In a voice communication device, a microphone and a speaker must be provided in order to allow a user to send and receive audio signals with another compatible device used by another person.

In a typical telephone, a handset is provided which is a shaped form having two transducers, e.g. a microphone and a speaker, positioned in a well-spaced relationship. Meanwhile, portable communication devices, such as cellular phones, have smaller and smaller form factors. Locating transducers in a cellular phone is a difficult task, because there are space restrictions on potential locations for the transducers and in certain confined spaces, the location of a transducer, such as a microphone, must be sufficiently isolated from signal interference generated from other devices within the phone. As such, in some instances a microphone may need to be placed at a location which is not especially close to the associated microphone port in the housing of the phone.

There is a need for an arrangement which addresses such difficulties in the prior art.

BRIEF DESCRIPTION OF DRAWINGS

The foregoing and other aspects of the disclosure will become more apparent from the following description of specific embodiments thereof and the accompanying drawings which illustrate, by way of example only, the principles of the disclosure. In the drawings, where like elements feature like reference numerals (and wherein individual elements bear unique alphabetical suffixes).

DETAILED DESCRIPTION OF AN EMBODIMENT

Figure 1:
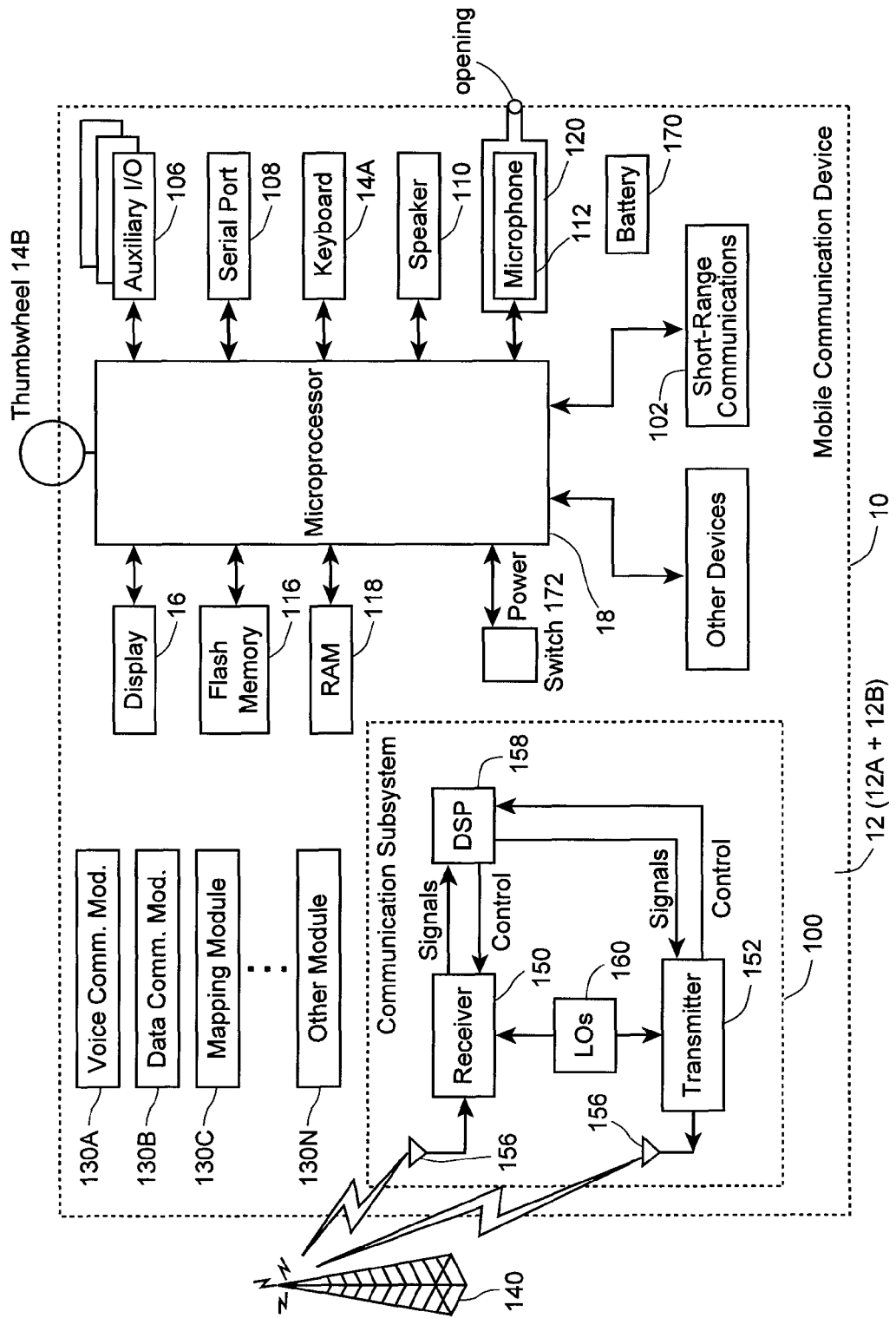
FIG. 1 is a block diagram of a communication device having a microphone and a microphone coupler according to an embodiment of the disclosure.

The description which follows, and the embodiments described therein, are provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

In a first aspect, a handheld, mobile communication device is provided. The device comprises: a housing including a housing port; a microphone in the housing; circuitry in the housing and connected to the microphone; a coupler including an acoustic conduit having a first end in communication with the housing port and a second end, and a body section associated with the microphone and in communication with the second end of the acoustic conduit; and a support to brace the coupler in the housing.

In the mobile communication device, the housing may include a bottom cover and the housing port is in the bottom cover.

In the mobile communication device, the housing may include an antenna adjacent the housing port.

In the mobile communication device, the antenna may send or receive information from a voice network or a data network.

In the mobile communication device, the housing may include a voice communication subsystem in communication with the microphone and the antenna.

In the mobile communication device, the support may be connected to the acoustic conduit.

In the mobile communication device, the body section may define an acoustic chamber adjacent the second end of the acoustic conduit.

In the mobile communication device, the acoustic conduit may be plastic and the support may be plastic.

In the mobile communication device, the body section may fit around the microphone.

In the mobile communication device, the body section may include a radio frequency shield around the microphone.

In the mobile communication device, the radio frequency shield may include an aperture to allow acoustic signals to the microphone.

In the mobile communication device, the body section may include an interior cavity.

In the mobile communication device, the coupler may form an air channel to the microphone from ambient surroundings outside the housing.

In the mobile communication device, the air channel may include a sealed acoustic chamber.

In the mobile communication device, the microphone may be a silicon-based transducer.

In the mobile communication device, the acoustic conduit may have an interior cross section of approximately 4 mm$^2$.

In the mobile communication device, the acoustic conduit may have a length of approximately 10 to 15 mm.

In a second aspect, a mobile telephone is provided, comprising: a housing forming a case with an acoustic port; an input device supported by the housing; an output device supported by the housing; a communication subsystem in the housing; a microphone in the housing; an acoustic conduit, in the housing, having a first end in communication with the acoustic port and a second end, and a body, in the housing, associated with the microphone and in communication with the second end of the acoustic conduit; and a support to align the acoustic conduit in the housing.

In the mobile telephone, the support may extend from the acoustic conduit.

In the mobile telephone, the output device may be a display; the microphone may convert acoustic signals to electrical signals and sends the electrical signals to the communication subsystem; the communication subsystem may convert the electrical signal to a radio frequency signal and send the radio frequency signal to an antenna that is mounted in the housing, wherein the antenna is mounted in the housing; and the body may be affixed in the housing.

In another aspect, a microphone coupler for a communication device is provided. The communication device comprises a printed circuit board and a microphone mounted on the printed circuit board, where the microphone is mounted on a first side of the printed circuit board and the microphone has a port facing towards the printed circuit board and aligned with an opening through the printed circuit board. The coupler comprises: a conduit having an internal channel therein, a distal end, a proximal end, a first opening in the distal end connecting to the internal channel and a second opening in the proximal end connecting to the internal channel. In the coupler, the proximal end is located about the opening of the printed circuit board and the second opening is mated to the opening of the printed circuit board; and the distal end extends towards an end of the printed circuit board.

In the coupler, the conduit may be oblong in shape.

In the coupler the conduit may be attachable to the printed circuit board through at least one of a friction fit, a fixative or a weld.

In the coupler, the conduit may have a length of between approximately 10 and 15 mm.

In the coupler, the first opening may have a cross-sectional area being approximately 4 mm$^2$.

In the coupler, the first opening may have cross-sectional dimensions of approximately 1 mm×3 mm.

In still another aspect, a microphone coupler for a microphone located within a housing of a communication device is provided. The coupler comprises a body section and a conduit. The body section is shaped to fit around the microphone. It is defined by one or more walls and within the walls an interior cavity is defined. One wall has a port in through connecting to the internal cavity. The internal cavity is defined to receive at least a portion of the microphone and to define a spaced relationship between the microphone and the body section. The conduit has an internal channel therein, a distal end, a proximate end, a first opening in the distal end connecting to the internal channel and a second opening in the proximate end connecting to the internal channel. For the conduit, the proximate end is connected to the body section and the second opening mates with the port. Further, the distal end extends towards a microphone opening in the housing.

In the microphone coupler, the proximate end of the conduit may mate with a side wall of the body section.

In the microphone coupler, the conduit and the body section may be formed as a single piece.

In the microphone coupler, the conduit may have a longitudinal length of between 10 mm and 15 mm.

In the microphone coupler, there may be a support member connected to the conduit, which is attachable to a location within the housing to provide a brace for conduit.

In the microphone coupler, the coupler is comprised of a plastic material.

In another aspect, a portable communication device for communicating signals in a wireless manner is provided. The device comprises a housing, a printed circuit board, a microphone located within the housing on the printed circuit board, an antenna located at least in part within the housing and a microphone coupler for the microphone located within the housing. The coupler comprises a body section shaped to fit around the microphone and a conduit. The body section has a port through a wall of the body section and an internal cavity within the body section. The cavity is shaped to receive at least a portion of the microphone and to define a spaced relationship between the microphone and the body section. The conduit has an internal channel therein, a distal end, a proximate end, a first opening in the distal end connecting to the internal channel and a second opening in the proximate end connecting to the internal channel. In the conduit, the proximate end is connected to the body section and the port mates with the first opening. Further, the distal end extends towards a microphone opening in the housing.

In the device, the antenna may be located within the housing in a volume between the body section to the microphone.

In the device, the antenna may be located in a bottom portion of the housing.

In the device, the microphone and coupler may be located on a bottom side of the circuit board.

In the device, the conduit may span the volume and may connect the port with the microphone opening.

The device may further comprise an RF shield can for isolating the microphone from interference caused from signals associated with the antenna. The RF shield can is located between the microphone and the coupler.

The device may further comprise a support member providing a brace for the conduit, where the support member is attached to a location within the housing at one end and is attached to the conduit at another end.

The device may further comprise a gasket located about the microphone providing a channel from the microphone to outside the RF shield can.

The device may further comprise a keypad device located on a top side of the circuit board.

In another aspect, the coupler comprises only the conduit and is located on a top side of the circuit board. Further, the microphone is located on the bottom side and is in communication with the coupler through an opening in the circuit board.

In other aspects various combinations of sets and subsets of the above aspects are provided.

FIG. 1 schematically illustrates a handheld mobile communication device 10 and its components, including a housing 12, an input device (e.g. keyboard 14A or thumbwheel 14B) and an output device (a display 16), which is preferably a graphic Liquid Crystal Display (LCD), although other types of output devices may alternatively be utilized. Typically, housing 12 is a molded polycarbonate structure and may be formed via known plastic forming techniques. To assist in assembly of device 10, housing 12 typically comprises two or more pieces which fit together in a fitted arrangement to enclose the internal devices and form an exterior casing for device 10. For example, housing 12 may comprise an upper housing (12A) and a lower housing (12B). Physically for device 10, housing 12 may be elongated vertically, or may take on other sizes and shapes (including clamshell housing structures).

A processing device (a microprocessor 18) is shown schematically in FIG. 1 as coupled between keyboard 14A, thumbwheel 14B, display 16 and a series of other internal devices to device 10. For the purposes of the description, the term keypad and keyboard refers to both the exterior mechanical exposed key elements and the underlying switch and activation elements (e.g. elastomers, domes and contact regions).

The microprocessor 18 controls the operation of the display 16, as well as the overall operation of the device 10, in response to actuation of keys on the keyboard 14A or thumbwheel 14B by a user. Exemplary microprocessors for microprocessor 18 include Data 950 (trade-mark) series microprocessors and the 6200 series microprocessor, both available from Intel Corporation.

In addition to the microprocessor 18, other internal devices of the device 10 are shown schematically in FIG. 1. These devices include: a communication subsystem 100, a short-range communication subsystem 102, a set of auxiliary I/O devices 106, a serial port 108, a speaker 110 and a microphone 112. Memory for device 10 is provided in flash memory 116 and Random Access Memory (RAM) 118. Internal devices are enclosed within housing 12 and typically are either mounted onto a printed circuit board (PCB), affixed to an interior part of the housing or suspended by some means within housing 12. Microphone coupler 120 provides an acoustic chamber connecting microphone 112 from within device 10 to an opening (opening 224, FIG. 2) in the housing, thereby providing an air channel for microphone 112 to the ambient exterior surroundings of device 10. Aside from designed openings in coupler 120, preferably, coupler 120 provides a sealed, or mostly sealed, acoustic chamber.

The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as another software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. PIM application is also preferably capable of sending and receiving data items via a wireless network 140.

Communication functions, including data and voice communications, are performed through the communication subsystem 100, and possibly through the short-range communication subsystem 102. Communication subsystem 100 includes receiver 150, transmitter 152 and one or more antennae, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice networks, both separate and integrated, may also be utilized with device 10. It will be appreciated that some signals received and transmitted through the subsystem 100 may provide interfering signals with other components in device 10, such as microphone 112.

Network access requirements vary depending upon the type of communication system which can communicate with device 10. For example, in the Mobitex (trade-mark) and DataTAC (trade-mark) networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, device 10 may send and receive communication signals over communication network 140. Signals received from communication network 140 by the receive antenna 154 are routed to receiver 150, which provides for signal amplification, frequency down conversion, filtering, channel selection, etc., and may also provide analog to digital conversion. Analog-to-digital conversion of received signals allows the DSP 158 to perform more complex communication functions, such as signal demodulation and decoding. In a similar manner, signals to be transmitted to network 140 are processed (e.g., modulated and encoded) by DSP 158 and are then provided to transmitter 152 for digital to analog conversion, frequency up conversion, filtering, amplification and transmission to communication network 140 (or networks) via the transmit antenna 156.

In addition to processing communication signals, DSP 158 provides for control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is input to microprocessor 18. The received signal is then further processed by microprocessor 18 for an output to the display 16, or alternatively to some other auxiliary I/O devices 106. A device user may also compose data items, such as e-mail messages, using keyboard (keypad) 14A, thumb-wheel 14B and/or some other auxiliary I/O device 106, such as a touchpad, a rocker switch or some other type of input device. The composed data items may then be transmitted over communication network 140 via communication subsystem 100.

In a voice communication mode, overall operation of device 10 is substantially similar to the data communication mode, except that received signals are output to speaker 110, and received audio signals are provided to microphone 112 for further conversion into an electrical signal and further processing by device 10. Microphone 112 is preferably a silicon-based transducer which can be mounted to PCB 104 (shown in FIG. 2).

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. Power switch 172 provides a separate on/off switch for device 10.

Figure 2:
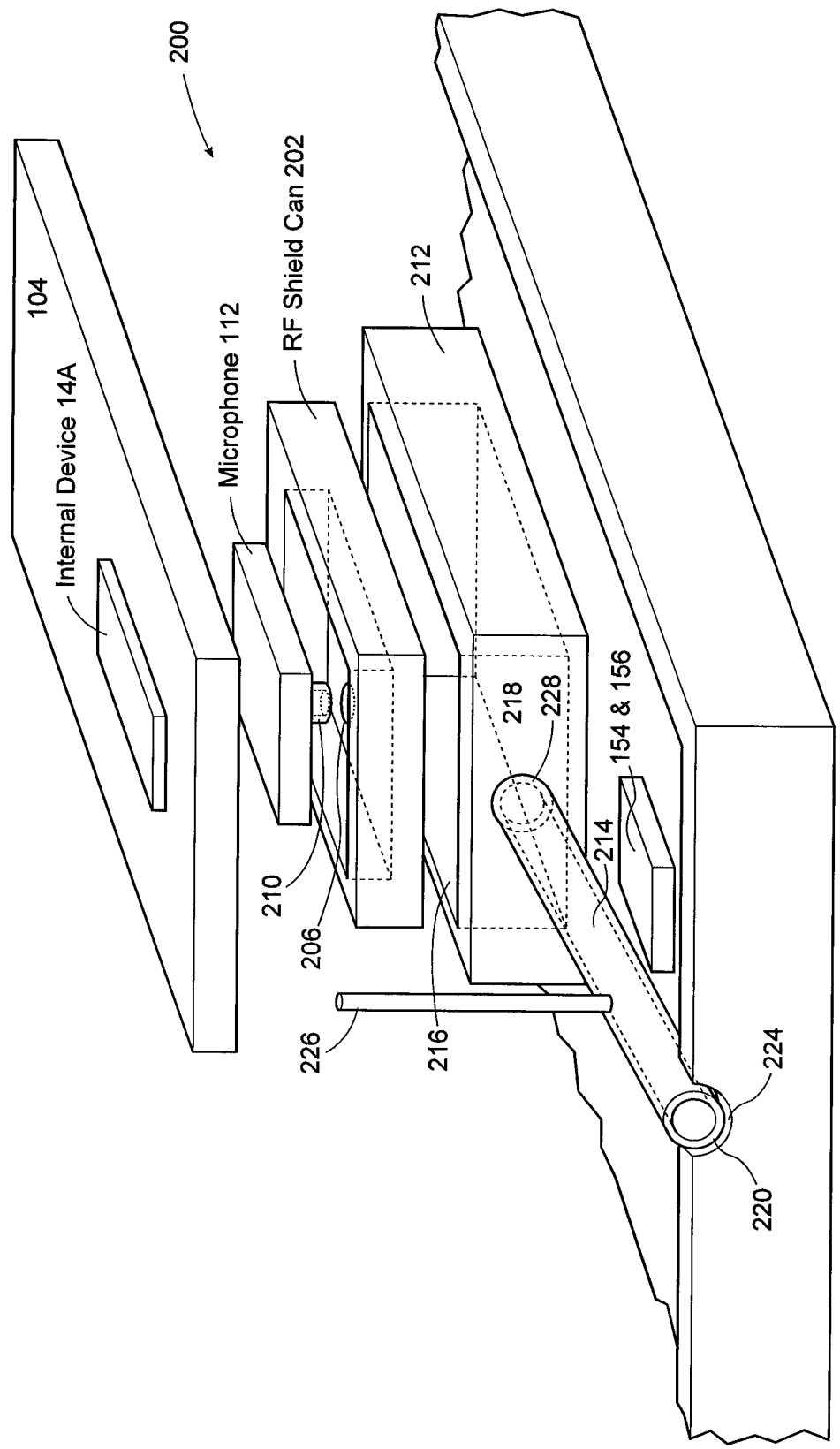
FIG. 2 is an exploded perspective view of aspects of the microphone coupler and its surrounding components of a first implementation of the device of FIG. 1.
Figure 3:
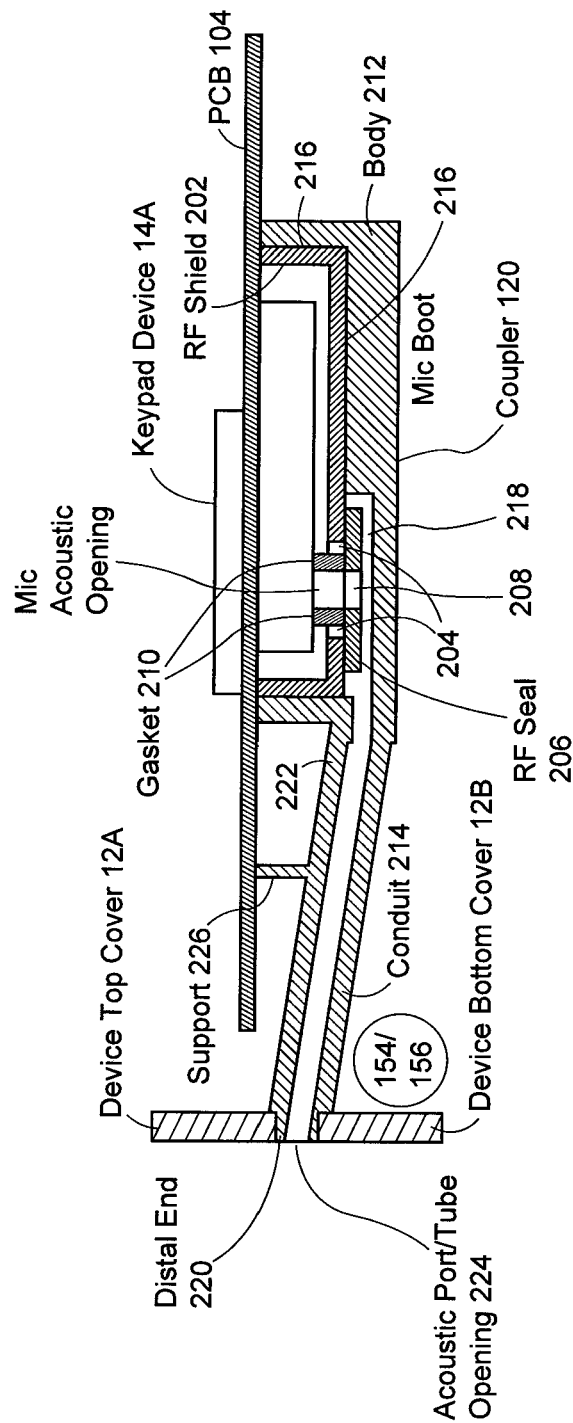
FIG. 3 is side cross-section view of the microphone and its surrounding components of the implementation of FIG. 2.

Referring to FIGS. 2 and 3, further detail on aspects of housing 12 and internal devices of device 10. First, PCB 104 provides a substrate for mounting and supporting the internal devices on both of its top and bottom sides and provides some electrical circuitry for the devices, as defined by etchings within the layers of plastic and copper. As such, devices can be more densely packed thereon, thereby reducing the size of PCB 104. PCB 104 is securely mountable within housing 12, typically via screws. PCB 104 is a generally planar sandwich of layers of plastic (or FR4) and copper.

Certain physical and operational restrictions may affect the location of devices on PCB 104 and to their placement on a particular side thereof. For example, a conventional industrial exterior design of device 10 has keypads on its top surface, thereby requiring that the electrical components relating to the keypad be placed on the top side of PCB 104. Similarly, microphone 112 can be sensitive to interference signals from antenna 154 and 156 and display 16. As such, it is preferable to locate microphone 112 as far away as possible from such devices. In one design layout, at least one of antennae 154 and 156 is located on the bottom side of circuit board 104 in the bottom part of device 10. To assist in isolating microphone 112 from interference from such antennae 154 and 156, microphone 112 is located in a central region of PCB 104. However, since one or more elements of keypad 14A (e.g. dome and contact elements) is located on the top side of the central region of PCB 104, microphone 112 is located on the bottom side of the central region of PCB 104. This positioning also provides more efficient use of the total available surface area of PCB 104.

To further assist in shielding microphone 112, radio frequency (RF) shield can 202 is provided to cover microphone 112 on PCB 104. Shield can 202 provides a Faraday shield to isolate microphone 112 from electromagnetic interference. Such interference may originate from signals received and generated by either antenna 154 or 156. Shield can 202 has aperture 204 therein to allow audio signals entering opening 224 to ultimately enter shield can 202 and be provided to microphone 112. Aperture 204 is covered in part by RF seal 206 which is a shaped, flat piece, larger than aperture 204. Seal 206 has an aperture 208 located therein. RF seal 206 is located over aperture 204, with aperture 208 aligned with aperture 204, thereby defining an opening in RF shield can 202. Shield can 202 and RF seal 206 are preferably made of metal and are shaped to completely enclose microphone 112, but for aperture 204, when microphone 112 is mounted onto PCB 104. Shield can 202 is oblong in shape, but any suitable shape may be used. RF seal 206 is fixed to shield can 202 by an appropriate fixative, such as double sided tape, adhesive or weld. Alternative embodiments may dispense with having a shield can.

Gasket 210 is an annular ring and is dimensioned to fit within aperture 204 and is comprised of a compressible material and to rest against the acoustic receiving part (e.g. the microphone opening) of microphone 112. Gasket 210 provides an acoustic conduit for audio signals received at aperture 208, allowing such signals to reach microphone 112. In the embodiment, it is compressible by approximately 40%. Seal 206 is positioned such that its upper end rests against gasket 210 and its lower end extends downward to the top surface of the bottom of shield can 206. Other materials may be used if other compression characteristics are required. Alternative embodiments may dispense with having a gasket. Aperture 204 is dimensioned to be able to accommodate gasket 210 within and still provide an appropriate RF shield for microphone 112 when seal 206 is in electrical and physical contact with can 202. It is not necessary that aperture 204 provides a tight fit around gasket 210.

In the embodiment, microphone 112 and shield can 202 are components which can be surface mounted to PCB 104. However, during an SMT soldering process, there may be difficulties in simultaneously mounting can 202 and gasket 210 to PCB 104. As such, shield can 202 is provided with aperture 204. In a second stage of assembly of components onto PCB 104 following the SMT process, gasket 210 is inserted in place and RF seal 206 is placed and fixed over aperture 204.

Microphone coupler 120 is a shaped body which encloses RF shield can 202 and provides another acoustic conduit to carry audio signals from external sources around device 10 to aperture 208 (and ultimately again, to microphone 112). Coupler 120 comprises a body section 212 and a conduit 214. Body section 212 is defined by a series of walls and within the walls an interior cavity 216 is defined and shaped to provide a snug fit around a part (or even all) of RF shield can 202. Interior cavity 216 defines air space 218 immediately below aperture 208 to enable audio signals to traverse to aperture 208. Conduit 214 is generally an elongated tube having distal end 220, proximal end 222 and openings at each end. Distal end 220 mates with opening 224 in housing 12. Proximal end and its opening mates with a port in one of the walls of body section 212. One purpose of conduit 214 is to provide an acoustic chamber to connect microphone 112 to opening 224 to allow microphone 112 to receive audio signals arriving at the opening with minimal (or tolerable) loss in the strength of the audio signals. The opening at proximal end 222 connects with interior cavity 218. As such, a continual air channel is provided from outside of the device to opening 224 through conduit 214, then through interior cavity 218, then through apertures 204 and 208 and finally to microphone 112. One embodiment has conduit 214 having a length of between approximately 10 to 15 mm and the cross-sectional area of the conduit being approximately 4 mm$^2$. Other cross sectional dimensions can be approximately 1 mm×3 mm. Other shapes for the cross section may also be provided. Other longer and shorter lengths and cross-sectional dimensions may be used. In the embodiment, the acoustic chamber defined by conduit 214 passes through a volume of space in which one or more of antennae 154 and 156 are located. As such, if an antenna or another device which interferes with the operation of microphone 112 is placed in a volume of space which audio signals must pass through to reach microphone 112 from opening 224, conduit 214 provides at least two functions. First, conduit 214 allows microphone 112 to be placed in a spaced relationship to the antenna (or other device) such that the interference caused by the antenna (or other device) is reduced to a tolerable level. Second conduit 214 carries such audio signals to microphone 112.

Support 226 is generally a beam and extends upwardly from conduit 214 to contact PCB 104, thereby providing a brace for conduit 214 to PCB 104. The specific location of support 226 on conduit 214 may be in any suitable location. Further the specific contact point on PCB 104 may also be any suitable location thereon. Further still, the shape and dimensions of support 226 may be almost defined to meet any requirements or limitations, including structural, spacing, support and material requirements. Coupler 120 may be mounted to PCB 104 using a fixative, such as double sided adhesive tape or an adhesive. It will be appreciated that with coupler 120, microphone 112 may be placed in more locations within device 10 (e.g. more locations which are further away from signal interfering sources, such as antenna 154 and 156 and display 16) and while providing a channel to allow audio signals to be carried from microphone opening 224 in housing 12 to the microphone without serious degradation in signal strength. In other embodiments, support 226 may not be required or other structural supports to other interior locations within housing 12 may be provided.

In one embodiment body section 212 and conduit 214 are formed as a single unit. In other embodiments, conduit 214 is attachable to body section 212 through an appropriate means, including a friction fit, a fixative (such as tape or glue), a weld, a thread and screw mechanism, a "snap" fit or other connection mechanisms known in the art.

Also, other shapes and dimensions for components of coupler 120 may be used in other embodiments. Still further, coupler 120 may be shaped to provide a snug fit around shield can 202 thereby reducing the need for fixing coupler 120 to PCB 104. The physical profile of coupler 120 may be designed such that bends and turns taken by any audio signals passing through coupler 120 are not degraded to an extent where the signals are not strong enough for microphone 112 to operate effectively.

Preferably coupler 120 is made of an elastic, plastic or a flexible material, such as rubber, silicone or urethane. Alternatively, coupler 120 may be formed in part or in whole by any one or a combination of structures formed in PCB 104, housing 12, upper housing 12A and lower housing 12B. Conduit 214 is shaped, sized and angled to mate with an opening (or port) in a wall of coupler 120 which connects to interior cavity 218. As shown, conduit 214 extends slightly upwardly from the lower region of body section 222 upwardly to opening 224. In other embodiments, opening 224 may be located on the top, side or bottom of housing 12. For example, if opening 224 were located more towards the rear of the bottom of housing 12 (as is shown), then conduit 214 extends directly downward from body section 222 to the location of opening 224.

It will be appreciated that in other embodiments, the location of the components for the microphone 112 and coupler 120 may be placed on the top side of PCB 104. Also, depending on the location of antennae 154 and 156, the shape of body section 212 and conduit 214 may be designed to accommodate physical, material and signal isolation requirements to meet the environment of the locations of the relevant components. For example, in another embodiment, shield can 202 and seal 206 may not be used and coupler 120 forms a fit around microphone 112 alone. The fit may be a tight fit.

Figure 4:
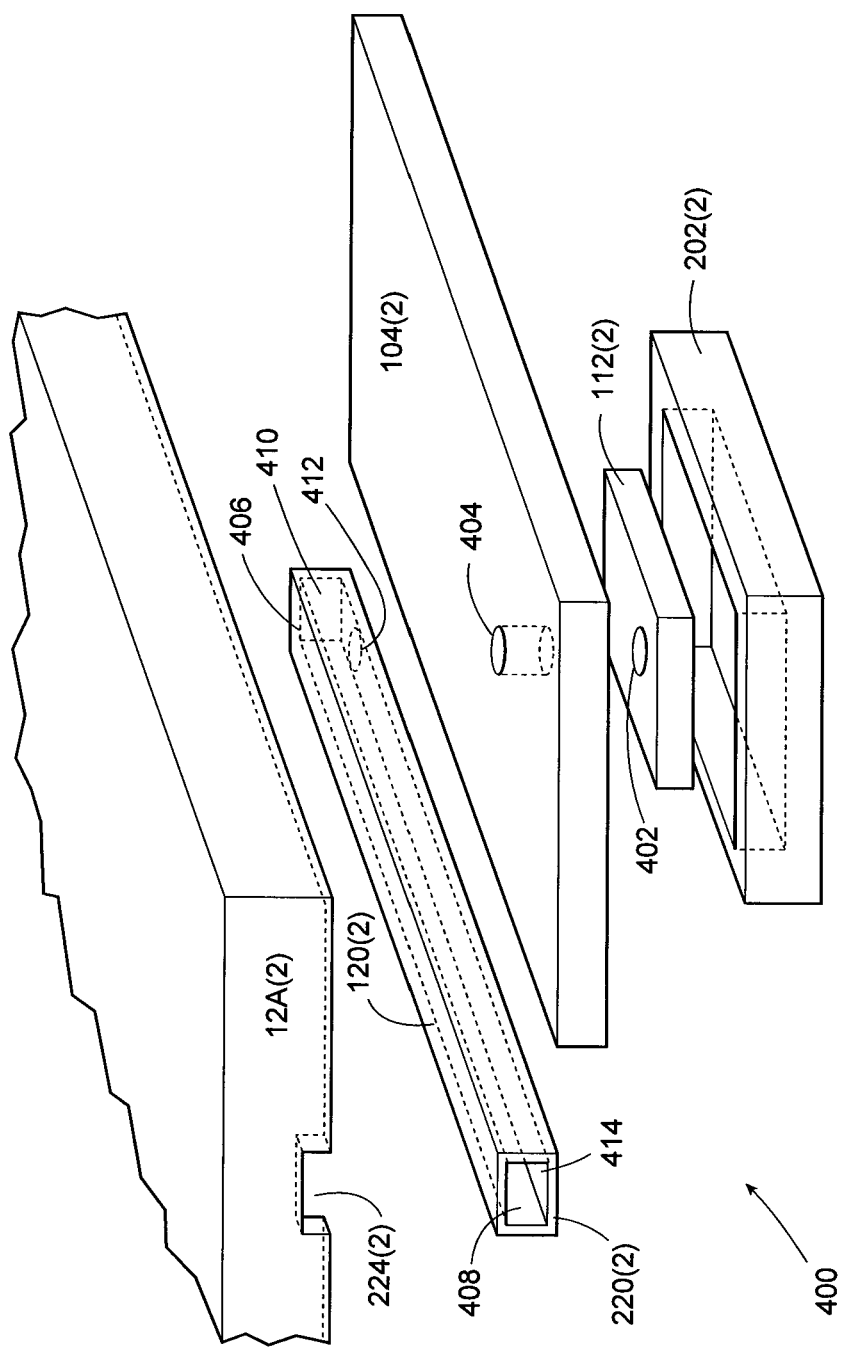
FIG. 4 is an exploded perspective view of aspects of the microphone coupler and its surrounding components of a second implementation of the device of FIG. 1.
Figure 5:
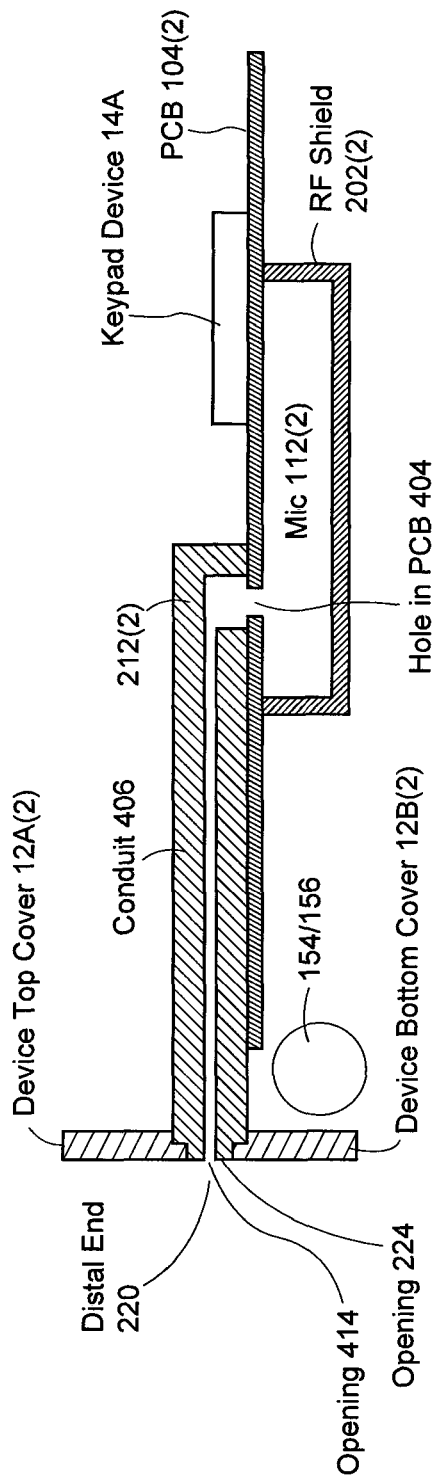
FIG. 5 is side cross-section view of the microphone and its surrounding components of the implementation of FIG. 4.

Referring to FIGS. 4 and 5 another embodiment is shown. As there are similarities between selected components in FIGS. 4 and 5 and components in FIGS. 2 and 3, where a like component is shown in FIGS. 4 and 5, its reference numeral is the same as provided in FIGS. 2 and 3, but a (2) suffix is added.

In FIGS. 4 and 5, view 400 provides an exploded view of elements of another embodiment. Therein, microphone 112 (2) is a "zero height" microphone. An exemplary zero-height microphone is an SMT device and is available from Knowles Acoustics of Itasca, Ill., U.S.A. In this implementation, microphone 112(2) receives audio signals to microphone port 402 which is on the surface mount side (i.e. the underside) of microphone 112(2). As such, in order to provide access for audio signals to reach the acoustic port of microphone 112(2), opening 404 is provided through PCB 104(2) provides a channel from the top side to the bottom side of PCB 104(2). Opening 404 is located on PCB 104(2) where the acoustic port 402 of microphone 112(2) will be located when permanently mounted to PCB 104(2). Opening 404 may be formed as a via opening and may be lined or not.

To further assist in shielding microphone 112(2), radio frequency (RF) shield can 202(2) is provided to cover microphone 112(2) on PCB 104(2). Shield can 202(2) provides a Faraday shield to isolate microphone 112(2) from electromagnetic interference. Such interference may originate from signals received and generated by either antenna 154 or 156. Here, shield can 202(2) is preferably made of metal and is shaped to completely enclose microphone 112(2) when microphone 112(2) is mounted onto PCB 104(2). Shield can 202(2) is oblong in shape, but any suitable shape may be used. Alternative embodiments may dispense with having a shield can. In the embodiment, microphone 112(2) and shield can 202(2) are components which can be surface mounted to PCB 104(2).

Coupler 120(2) comprises conduit 406. Conduit 406 is generally an elongated tube having distal end 408, proximal end 410 and openings at each end (414 and 412). Distal end 408 mates with opening 224(2) in housing 12. Proximal end 410 has opening 412 on its bottom side which mates with opening 404. One purpose of opening 404 is to provide an acoustic chamber to connect microphone 112(2) to opening 412 to allow microphone 112(2) to receive audio signals arriving at the opening with minimal (or tolerable) loss in the strength of the audio signals. As such, a continual air channel is provided from outside of the device to opening 414, through conduit 406, through opening 412 and opening 404 and finally to microphone 112(2). One embodiment has conduit 406 having a length of between approximately 10 to 15 mm. Its interior cross section dimensions may be similar to dimensions noted earlier. Other longer and shorter lengths may be used. In the embodiment, the acoustic chamber defined by conduit 406 passes through a volume of space in which one or more of antennae 154 and 156 are located. As such, if an antenna or another device which interferes with the operation of microphone 112(2) is placed in a volume of space which audio signals must pass through to reach microphone 112(2) from opening 224(2), conduit 406 provides at least two functions. First, conduit 406 allows microphone 112(2) to be placed in a spaced relationship to the antenna (or other device) such that the interference caused by the antenna (or other device) is reduced to a tolerable level.

Coupler 120(2) may be mounted to PCB 104(2) using a fixative, such as double sided adhesive tape or an adhesive. It will be appreciated that with coupler 120(2), microphone 112(2) may be placed in more locations within device 10 (e.g. more locations which are further away from signal interfering sources, such as antenna 154 and 156 and display 16) and while providing a channel to allow audio signals to be carried from microphone opening 224(2) in housing 12 to the microphone without serious degradation in signal strength.

In one embodiment conduit 406 is formed as a single unit. In other embodiments, conduit 406 may be formed in part or in total by one or more of housing 12 and PCB 104(2). Conduit 406 is attachable PCB 104(2) through an appropriate means, including a friction fit, a fixative (such as tape or glue), a weld, a "snap" fit or other connection mechanisms known in the art.

Also, other shapes and dimensions for coupler 120(2) may be used in other embodiments. Still further, coupler 120(2) may be shaped to provide a snug fit around other components on its path on PCB 104(2). The physical profile of coupler 120(2) may be designed such that bends and turns taken by any audio signals passing through coupler 120(2) are not degraded to an extent where the signals are not strong enough for microphone 112(2) to operate effectively.

Preferably coupler 120(2) is made of an elastic, plastic or a flexible material, such as rubber, silicone or urethane. Conduit 406 is shaped, sized and angled to mate with an opening 404 (or another port) in circuit board 104(2). In other embodiments, opening 224(2) may be located on the top, side or bottom of housing 12. For example, if opening 224(2) were located more towards the rear of the bottom of housing 12 (as is shown), then conduit 406 may either extend past PCB 104(2) then extend directly to the location of opening 224(2) or through PCB 104(2) through an appropriate opening and then towards opening 224(2).

In other embodiments, depending on the location of port 402, coupler 120(2) may be located on a same side of PCB 104(2) as microphone 112(2) (top or bottom). Also, depending on the location of antennae 154 and 156, the shape of conduit 406 may be designed to accommodate physical, material and signal isolation requirements to meet the environment of the locations of the relevant components. For example, in another embodiment, shield can 202(2) may not be used.

Although the disclosure has been described with reference to certain specific embodiments, various modifications thereof will be apparent to those skilled in the art without departing from the scope of the disclosure as outlined in the claims appended hereto.

The invention claimed is:

1. A handheld, mobile communication device comprising:
    a housing including a housing port;
    a printed circuit board (PCB);
    a microphone on the PCB in the housing;
    circuitry in the housing and connected to the microphone;
    a coupler including:
        an acoustic conduit having a first end in communication with the housing port and a second end, and
        a body section covering the microphone, contacting the PCB and being in communication with the second end of the acoustic conduit; and
    a support connected to the acoustic channel to brace the coupler in the housing.

2. The mobile communication device of claim 1, wherein the housing includes a bottom cover and the housing port is in the bottom cover.

3. The mobile communication device of claim 1, wherein the housing includes an antenna adjacent the housing port.

4. The mobile communication device of claim 3, wherein the antenna can send or receive information from a voice network or a data network.

5. The mobile communication device of claim 3, wherein the housing includes a voice communication subsystem in communication with the microphone and the antenna.

6. The mobile communication device of claim 1, wherein the body section defines an acoustic chamber adjacent the second end of the acoustic conduit.

7. The mobile communication device of claim 1, wherein the acoustic conduit is plastic and the support is plastic.

8. The mobile communication device of claim 1, wherein the body section covers the sides and top of the microphone.

9. The mobile communication device of claim 1, wherein the body section includes a radio frequency shield around the microphone.

10. The mobile communication device of claim 9, wherein the radio frequency shield includes an aperture to allow acoustic signals to the microphone.

11. The mobile communication device of claim 1, wherein the body section includes an interior cavity.

12. The mobile communication device of claim 1, wherein the coupler forms an air channel to the microphone from ambient surroundings outside the housing.

13. The mobile communication device of claim 12, wherein the air channel includes a sealed acoustic chamber.

14. The mobile communication device of claim 1, wherein the microphone is a silicon-based transducer.

15. The mobile communication device of claim 1, wherein the acoustic conduit has an interior cross section of approximately 4 $mm^2$.

16. The mobile communication device of claim 1, wherein the acoustic conduit has a length of approximately 10 to 15 mm.

17. A mobile telephone comprising:
    a housing forming a case with an acoustic port;
    a printed circuit board (PCB);
    an input device and supported by the housing;
    an output device supported by the housing;
    a communication subsystem in the housing;
    a microphone located on the PCB and located in the housing;
    an acoustic conduit, in the housing, having
        a first end in communication with the acoustic port and a second end, and
        a body, in the housing, covering the microphone, contacting the PCB and being in communication with the second end of the acoustic conduit; and
    a support extending from the acoustic conduit and aligning the acoustic conduit in the housing.

18. The mobile telephone of claim 17, wherein:
    the output device is a display;
    the microphone converts acoustic signals to electrical signals and sends the electrical signals to the communication subsystem;
    the communication subsystem converts the electrical signal to a radio frequency signal and send the radio frequency signal to an antenna that is mounted in the housing, wherein the antenna is mounted in the housing; and
    the body is affixed in the housing.

* * * * *